United States Patent Office 3,093,600
Patented June 11, 1963

3,093,600
AMINOTRIAZINE-ALDEHYDE FOAM MODIFIED WITH A PRIMARY TRIOL
Frank R. Spencer, Stamford, Conn., and Alex J. Malashevitz, Cincinnati, Ohio, assignors to Formica Corporation, Cincinnati, Ohio, a corporation of Delaware
No Drawing. Filed Sept. 30, 1960, Ser. No. 59,484
12 Claims. (Cl. 260—2.5)

This invention relates to novel solid foams derived from aminotriazine-aldehyde condensates and to methods of preparing such foams. More particularly, this invention relates to methods of preparing novel, rigid resin foams of the open-cell type from aminotriazine-aldehyde condensates by modifying said condensates with primary triols, as well as to foamed products thus prepared which exhibit marked heat and fire resistance, improved resilience, solvent resistance and resistance to cracking on drying.

Solid foams derived from a wide variety of materials, e.g., cellulose acetate, polystyrene, polyurethanes, phenol-formaldehyde condensates and urea-formaldehyde condensates have found many uses in recent years. Large quantities of rigid foams have been used in thermal and acoustical insulating compositions, in packaging to cushion against impact shock, and in a wide variety of more limited applications. However, all such foamed materials have at least one undesirable property which precludes their use in many important applications, despite many attempts by the prior art to overcome such deficiencies. Many of these attempts have been confined to the manipulative steps employed in the production of the foam, and it is contemplated that the best of these procedures may be appropriated to produce the resin foams of this invention. However, the improvements realized by the practice of this invention are fundamentally related to the nature of the modified aminotriazine-aldehyde condensate which we use in the preparation of the foam.

As an example of the aforementioned undesirable properties, resin foams derived from urea-formaldehyde condensates are inherently fragile and possess comparatively low resilience and poor abrasion resistance. As a result, manufacturers of insulating blocks experience large losses due to breakage and disintegration when cutting or shaping their foamed products. Furthermore, excessive care must be taken by the consumer in slightly bending, compressing or otherwise handling these materials as the particular use may demand.

Another example of an undesirable property is that possessed by polystyrene foams, which burn freely when brought in contact with a flame.

Due to inherent defects of the type just mentioned, no prior art solid resin foam has been considered completely acceptable for use in sandwich panels designed to be structural members of buildings. Here the faces of the panel are usually hard, impermeable sheets, with the foam making up the inner bulk or core of the panel. A foam core must be: (a) of lowest density consistent with the desired strength, (b) a good thermal insulator, (c) preferably fire resistant, and (d) strong enough to withstand deformation under the temperature range of the ultimate application.

These criteria define the desired performance of the finished foam but not the intrinsic properties of a plastic which may be foamed. Such a plastic must also have three fundamental mechanical properties during foaming: (1) the labile foam must have the right density, (2) the fine structure or cell size must be small, and (3) the foam must be able to withstand the stresses of returning to room conditions without unfavorable loss of the first two properties, i.e., it must be stable.

Aminotriazine-aldehyde condensates, and in particular, melamine-formaldehyde condensates, possess all of the above-mentioned mechanical properties to a greater or lesser extent during foaming. Furthermore, the resulting foams satisfy the fundamental requirements for a sandwich panel foam core. They gain compressive strength when heated up to at least 212° F. with only slight losses in weight and volume, and retain a majority of their strength at temperatures up to 300° F. They do not begin to yellow until heated to at least 425° F., and only gradually char in a flame. In addition, they have excellent resistance to chemicals and solvents which might be encountered in paints, adhesives, and the like, such as gasoline, benzene, ethyl acetate, methanol, acetone, 50% acetic acid and 5% sodium hydroxide.

However, foams prepared from unmodified aminotriazine-aldehyde condensates do possess several undesirable features which have limited their use in the preparation of sandwich panel foam cores. First of all, very careful control of pH must be observed during the foaming step. Associated with this is the fact that aminotriazine-aldehyde foams set up very quickly, thus presenting a handling problem. In addition, because of their rigid structure, foams prepared from unmodified aminotriazine-aldehyde condensates have a tendency to break on slight elongation and also tend to crack on drying. Any cracks occurring in the finished foam will, of course, result in a weakening of the foam and thus decrease its commercial acceptability.

Various attempts have been made by the prior art to overcome similar difficulties in other resin foams, for example, in those prepared from urea-formaldehyde condensates, and many substances have been blended into such foams as tougheners and plasticizers. Sorbitol, dextrose, gelatin, starch and formamide have been stated to have either no effect or a weakening effect in dried foams, while triethylene glycol, glycerin, ethylene urea, diglycolic acid and lactic acid have been stated to have a slight toughening effect. Propylene glycol has been disclosed as having a slightly better toughening effect than any of the five tougheners just mentioned, but on the other hand, it is also known that high molecular weight polypropylene glycols are not suitable, since they are only partially compatible with the resin. To further complicate the picture, polyethylene glycols have been disclosed as being effective in facilitating formation of improved urea-formaldehyde foams by slowing up the rate of hardening while at the same time imparting toughness and plasticity to the foams. Here too, however, the molecular weight is critical, since high molecular weight polyethylene glycols actually have a weakening rather than a toughening effect.

As far as we are aware, similar attempts have not been made to overcome the undesirable features inherent in unmodified aminotriazine-aldehyde foams.

We have now discovered that chemical modification of aminotriazine-aldehyde condensates with one or more primary triols results in resinous condensates which, when foamed, show considerable improvement with respect to the above-mentioned undesirable features but which still possess all of the necessary properties needed in materials used to prepare sandwich panel foam cores. Stable foams may be prepared from our modified aminotriazine-aldehyde condensates over much broader pH ranges, hence, the apparent wet fluidity or wet life of the labile foam is greatly increased. The tendency of foams made from aminotriazine-aldehyde condensates to crack on drying is greatly reduced by means of the modification of the present invention, and as a result, the rigid foams ultimately produced have greater strength on elongation.

It is, therefore, an object of our invention to prepare solid foams derived from aminotriazine-aldehyde condensates which have been modified with a primary triol.

A further object of our invention is the use of our novel, modified aminotriazine-aldehyde resin foams and particularly, our novel, modified melamine-formaldehyde foams in the preparation of sandwich panel foam cores.

These and other objects of our invention will be discussed more fully hereinbelow.

Aminotriazine-aldehyde resins of the type which may be modified in accordance with the present invention are well known in the art, and have been shown, for example, in U.S. Patent No. 2,197,357 to Widmer et al. The present invention is concerned particularly with the modification of thermosetting aminotriazine-aldehyde resins which are condensation products of ingredients comprising an aldehyde, e.g., formaldehyde, and an aminotriazine containing at least two amidogen groups, each having at least one aldehyde-reactable hydrogen atom and preferably two aldehyde-reactable hydrogen atoms attached to the amidogen nitrogen atom, e.g., melamine. We particularly prefer to use those partially polymerized aminotriazine-aldehyde resins which are heat curable or potentially heat curable resinous reaction products of ingredients comprising melamine and formaldehyde. However, other heat curable or potentially heat curable partially polymerized aminotriazine-aldehyde resinous reaction products may also be employed. Aminotriazines containing at least two amidogen groups, each having at least one aldehyde-reactable hydrogen atom attached to the aminotriazine nitrogen atom which may be reacted with an aldehyde to provide the partially polymerized product which is modified in accordance with out invention include, among others, the triamino-s-triazines represented by the structural formula:

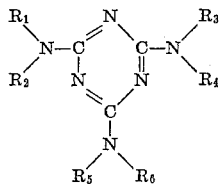

wherein any of $R_1$ to $R_6$ may be hydrogen, alkyl, cycloalkyl, alkenyl, cycloalkenyl, aryl, aralkyl, alkaryl, or hydroxyalkyl, with the proviso that in at least two of the aminotriazine substituents directly attached to the carbon atoms of the triazine nucleus at least one R is hydrogen. An illustrative but by no means exhaustive enumeration of such amino-s-triazines includes the following: melamine; 2-mono-R-amino-4,6-diamino-s-triazines such as the N-methyl, N-butyl, N-phenyl, N-tolyl and N-cyclohexyl melamines; 2,4,6-tris(mono-R-amino)-s-triazines such as 2,4,6-tris(methylamino)-s-triazine; 2-di-R-amino-4,6-bis(mono-R-amino)-s-triazines such as 2-dimethylamino-4,6-bis(methylamino)-s-triazine; the methylolmelamines such as the mono-, di-, and trimethylolmelamines, and the like.

Any suitable aldehyde may be utilized in preparing the partially polymerized aminotriazine-aldehyde resin. We prefer to employ formaldehyde, either as such or as an aqueous solution. Other aldehydes such as, for example, acetaldehyde, propionaldehyde, butyraldehyde, benzaldehyde, furfural; mixtures thereof or mixtures of formaldehyde with other such aldehydes may be employed. Paraformaldehyde, hexamethylenetetramine, trioxymethylene, paraldehyde or other compounds engendering aldehydes may also be employed.

In general, the partially polymerized aminotriazine-aldehyde resins are prepared in accordance with techniques well known in the art. The mol ratio of aminotriazine to aldehyde is not critical, and may be within the order of from about 1:1 to about 1:6, respectively, depending on the particular aminotriazine and aldehdye starting materials employed and the characteristics desired in the final product.

The aminotriazine and aldehyde are heat reacted, e.g., at temperatures ranging from about 40° C. to as high as reflux temperature, i.e., approximately 100° C. The preferred reaction temperature range is from about 80° C. to about 100° C.

The preparation of the aminotriazine-aldehyde resin is most conveniently carried out in aqueous medium. Additionally, it is preferred that the procedures for accomplishing co-reaction of the primary triol modifier with the aminotriazine-aldehyde resin, which will be more fully described hereinbelow, if observed, be carried out in aqueous medium.

As is well known, condensation reactions of aminotriazines and aldehydes are influenced by pH, the rate of reaction being accelerated by low pH. At relatively low pH's the reaction is so fast as to be uncontrollable or else the nature of the product is such that it has little utility in preparing foams. Thus, the practical pH working range for the preparation of an aminotriazine-aldehyde resin suitable for use in preparing a solid foam will generally be within the range of from about 6.5 to about 10 and preferably will be from about 8.5 to about 9.0. Any catalyst, e.g., weakly acidic or basic organic or inorganic solutions, may be employed to adjust the pH when required. Reaction under these alkaline conditions results for the most part in methylolation of the aminotriazine, although some degree of polymerization may occur. Therefore, suitable products are obtained as soon as the uncombined aldehyde within the reaction mixtures reaches a substantially minimum constant value, although the reaction may be carried on to relatively high resin solids contents, if desired. For example, the condensation of melamine and formaldehyde may be carried to the point where the resin begins to develop a degree of hydrophobic characteristics such as represented by a 60% aqueous solution of the condensate exhibiting coagulation on further dilution.

Aliphatic primary triols which may be used as modifiers for the aminotriazine-aldehyde resins include the trialkylolalkanes represented by the structural formula:

wherein $n$ is an integer of from 1 to 7, $n_1$ is an integer of from 0 to 6 and the sum of the integers n and $n_1$ can range from 1 to 7. Examples of such trialkylolalkanes include methylol diethylolethane, dimethylol ethylolethane, triethylolethane, methylol dipropylolpropane and the like. A further example of suitable trialkylolalkanes includes the trimethylolalkanes represented by the structural formula:

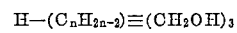

wherein $n$ is an integer of from 1 to 7, such as, for example, trimethylolmethane, the trimethylolethanes, i.e., 1,1,1-trimethylolethane and 1,1,2-trimethylolethane, the trimethylolpropanes, -butanes, -pentanes, -hexanes, and -heptanes. Still further examples of such trialkylolalkanes are the trialkylolmethanes of the structural formula:

$$HC\equiv[(CH_2)_n-CH_2OH]_3$$

wherein $n$ is an integer of from 0 to 6. Examples of such trialkylolmethanes include triethylolmethane, tripropylolmethane, ethylol dipropylolmethane, and the like.

Another class of aliphatic primary triols which may be employed in the process of our invention is the trialkylol aminomethanes represented by the structural formula:

$$H_2N-C\equiv[(CH_2)_n-CH_2OH]_3$$

wherein $n$ is an integer of from 0 to 6. Examples of these trialkylol aminomethanes include tris hydroxymethyl aminimethane, tris hydroxyethyl aminomethane, methylol diethylol aminoethane, and the like.

Still another class of aliphatic primary triols useful as modifiers in the preparation of our novel foamed compositions is the trialkylolamines represented by the structural formula:

$$N\equiv[(CH_2)_n-CH_2OH]_3$$

wherein $n$ is an integer of from 0 to 7. Examples of these trialkylolamines include trimethylolamine, triethylolamine, methylol diethylolamine, and the like.

The preferred method of incorporating the aforementioned aliphatic primary triols into aminotriazine-aldehyde resins to produce modified resinous compositions suitable for use in preparing our novel foams consists of heat reacting one or several of said triols with either a mixture of aminotriazine and aldehyde or with a partially polymerized aminotriazine-aldehyde condensate in amounts which will provide resinous syrups having mol ratios of aliphatic primary triol to aminotriazine initially present of from about 0.2:1 to about 1:1, respectively. The reaction may be carried out at temperatures ranging from about 40° C. to about 105° C., preferably at from about 85° C. to about 100° C., and at pH's within the range of from about 6.5 to 10, preferably about 8.5 to about 9.0. The reaction times necessary for the preparation of the modified resinous syrups depend on the temperature employed. Thus, suitable compositions can be made at the higher end of the indicated temperature range by holding the composition at elevated temperature for about 15 minutes. The holding times will be progressively increased as temperatures at the lower end of the stated range are employed. For example, where a temperature of about 80° C. is employed, the heat reaction will be continued for several hours. It is believed that a moderate and desirable amount of co-reaction occurs between the aminotriazine-aldehyde condensate and the primary aliphatic triol during the heat reaction. However, we do not wish to be bound by any particular theory as to either the kind and extent of such co-reaction or the nature of the resulting condensate.

Our aliphatic primary triol modifiers may also be blended with aqueous solutions of aminotriazine-aldehyde resin at any suitable temperature, e.g., at room temperature, and then foamed by any of the methods described more fully hereinbelow. It might be expected that the primary triols added in this manner could be easily removed from the foam by leaching out with water, but such is not the case, as is shown by the following data obtained for a typical modified foam:

TABLE I

| | |
|---|---|
| Mol ratio—melamine:formaldehyde [1] | 1:4 |
| Percent formic acid [2] | 1.4 |
| Percent trimethylolpropane | 33.6 |
| Percent foaming agent [3] | 3.1 |
| Foam pH | 4.8 |
| Foam density (lb./ft.[3]) | 0.9 |
| Percent weight loss on leaching for 4 days with water [4] | 8.0 |

[1] Spray-dried laminating resin containing minor amounts of toluene sulfonamide and methyl α-D-glucoside; see U.S. 2,773,788.
[2] Hardening agent.
[3] Based on total weight of water-free components.
[4] Based on total weight of components.

Resin solids contents suitable for effecting heat reaction or blending of the aminotriazine-aldehyde resin and primary triol modifier range from about 60% to about 80%. A resin solids content of about 65% is preferred, mainly to permit the use of conventional raw materials. Relatively high resin solids contents are desirable from the point of view of stability, particularly if long storage periods are anticipated prior to preparing a foam.

A wide variety of the methods disclosed in the prior art for effecting the production of foams may be used in preparing our novel foamed compositions. While the particular method or methods employed form no part of the present invention, a brief description of several suitable methods will be given for illustrative purposes.

One such method comprises dispersing gas, e.g., nitrogen, carbon dioxide, Freon, and the like, under pressure in an aqueous resinous syrup and thereupon curing the resin component while releasing the pressure abruptly, thus, producing a foam.

Other prior art methods embodying various ways of generating gas within a liquid resin system (aqueous solution or dispersion or liquid resin melt) prior to extensive gelation or solidification may be employed. The source of the gas may be:

(1) a by-product of the condensation reaction, e.g., in the case of melamine-formaldehyde condensates, vapors of water, methanol or both;

(2) a volatile, immiscible liquid, such as carbon tetrachloride, dispersed in a resin melt;

(3) the reaction of a dispersed metal, such as zinc; a primary hydride, such as sodium hydride or lithium hydride; or a complex hydride, such as potassium borohydride, sodium borohydride, lithium borohydride or aluminum borohydride with an acid which may also serve as the curing catalyst;

(4) the reaction of a carbonate, such as sodium carbonate, with an acid;

(5) an organic compound, such as an azide, which is thermally unstable.

In short, any suitable method of forming or introducing finely distributed gases prior to the hardening of the liquid resin system may be employed in the preparation of our novel resin foams. As previously indicated, the resinous starting materials may be liquefield either by means of a solvent such as water or by melting.

The foaming or cell-forming method which we prefer to use in the practice of our invention consists merely of whipping air into an aqueous solution of the modified aminotriazine-aldehyde resin containing a surface-active foaming agent, which facilitates the formation of a foam, and hardening said foam by means of an acid catalyst.

In accordance with this preferred method, the modified resin is diluted with water to give a solution having a resin solids content in the order of from about 25% to about 60%. Concentrations of resin solids above about 60% are to be avoided only inasmuch as concentrated solutions are difficult to whip into a foam having a density of less than 5 lbs./ft.[3]. Foams suitable for architectural purposes, e.g., for the construction of sandwich panel cores, advantageously have densities ranging from about 0.8 lb./ft.[3] to about 4.0 lbs./ft.[3]. Concentrations of less than about 25% resin solids are undesirable because of the tendency of many aminotriazine-aldehyde condensates to evidence insolubility characteristics in this dilution range.

To the aqueous solution of modified aminotriazine-aldehyde resin there is then added a foaming agent to facilitate the formation of a foam having some degree of stability. Suitable foaming agents which may be used include the surface-active foaming agents such as the sodium alkyl naphthalene sulfonates (Nekal BX–78), sodium isopropyl naphthalene sulfonate (Aerosol OS), N-octadecyl sulfosuccinamate (Aerosol–18), tetrasodium N-(1,2-dicarboxyethyl) - N - octadecyl-sulfosuccinamate (Aerosol–22), and the like. The amount of foaming agent can be varied depending on a number of factors, such as the nature of the foaming agent itself, the concentration of the resin solids in the aqueous syrup, and so on. The usual amount of the more commonly used foaming agents which will be employed ranges from about 0.5% to about 1.5% by weight, based on the total weight of resin solids.

Aeration of the aqueous solution of modified aminotriazine-aldehyde resin and foaming agent can be accomplished by any suitable means, such as by merely whipping it in a mechanical mixer such as a Hobart or Oakes mixer. Mixing is carried out until a wet foam having the desired specific gravity is obtained. A specific gravity in the order of from about 80 to about 130 grams per liter will usually be adequate to produce a labile foam having the desired consistency.

Particulate or fibrous fillers, such as α-cellulose, and pigments, dyes, and the like, may also be incorporated.

Either during foaming or after the foam has been whipped to the desired specific gravity and consistency, a small amount of a catalytic hardening agent is added thereto. The amount of catalytic hardening agent used will depend to some extent on the nature of the catalyst itself, but will generally be within the range of from about 1% to about 25% by weight, based on the total resin solids content of the labile foam. Suitable catalytic hardening agents include organic acids, such as formic, acetic, oxalic and the like, and inorganic acids, such as phosphoric, sulfuric, hydrochloric, and the like.

Following the addition of the catalytic hardening agent, the foam is molded as quickly as practical and the molded foam is then dried. Any suitable drying means, such as radiant or convection heating, may be used to treat the foam during this step, a particularly useful method being high frequency electric heating. The use of a high frequency electric current to develop heat within the foamed mass gives uniform heating throughout the mass, resulting in a substantially uniform cure and assuring a uniform cell structure.

In order that those skilled in the art may more fully understand the inventive concept presented herein, the following illustrative examples are set forth. These examples are given solely by way of illustration and should not be considered as expressing limitations unless so set forth in the appended claims. All parts and percentages are by weight, unless otherwise stated.

*Examples I–VI*

Six mols of melamine and twelve mols of formaldehyde (as a 37% aqueous solution) were adjusted to a pH of 8.5–9.0 with small amounts of triethanolamine. The mixture was heated to reflux and held at that temperature until the amount of solids remaining in suspension was negligible. The mixture was then divided into six equal parts. To each of three of these parts there was then added two mols of formaldehyde and one mol of a different primary triol, as shown in Table IIa. To the fourth part there was added two mols of formaldehyde and one mol of pentaerythritol, while to the fifth part two mols of formaldehyde alone were added. The sixth part, being unmodified, served as a control.

All six parts were re-heated to reflux and held at that temperature until the resulting high solids solutions could be diluted with water to at least 35–42% resin solids. At this point, any attempt at further dilution results in hydrophobe formation, as evidenced by coagulation in the resin solution, indicating that said solution will not tolerate further dilution. The resin solutions were then chilled in an ice-water bath.

To each of the cooled resin solutions there was added 1.2% sodium alkyl naphthalene sulfonates (Nekal BX-78). Air was then whipped into each solution by means of high speed electric mixers and, during aeration, sufficient formic acid was added to bring the pH of each batch to between 3.7 and 4.2. The resulting wet foams were allowed to gel in one quart lots and then dried for four days to a daily weight-loss rate of less than 0.25% per day. The characteristics of the resulting dried foams are listed in Table IIb below.

TABLE IIa

| Example | Mol ratio of formaldehyde to melamine | Trial modifier | Percent maximum dilutability |
|---|---|---|---|
| I | 2:1 | None | |
| II | 4:1 | ----do---- | 37 |
| III | 4:1 | Pentaerythritol | (¹) |
| IV | 4:1 | Trimethylolethane | 42 |
| V | 4:1 | Trimethylolpropane | 38 |
| VI | 4:1 | Tris hydroxymethyl aminomethane | 41 |

¹ Did not clarify.

TABLE IIb

| Foam | pH | Density (lb./ft.³) | Number of cracks formed on drying |
|---|---|---|---|
| I | 3.7 | 1.3 | 13 |
| II | 4.0 | 1.9 | 6 |
| III | | | |
| IV | 3.7 | 1.5 | 0 |
| V | 4.2 | 1.0 | 0 |
| VI | 4.0 | 1.5 | 0 |

From these data it can be seen that foams prepared from resins modified in accordance with our invention did not crack on drying, while a foam made from a unmodified resin did crack under the same conditions. No foam could be made from the pentaerythritol-modified resin. It can also be seen that in spite of the fact that minor amounts of one of the modifiers of our invention were added to the starting resin to regulate the pH, no modification occurred until amounts of modifiers within our disclosed range had been added, as is evidenced by the behavior of the control sample.

*Examples VII–XI*

500 grams of a commercially available melamine-formaldehyde resin having a mol ratio of melamine to formaldehyde of 1:2, respectively, were dissolved in water and divided into five batches, each containing 100 grams of resin. Each batch was then blended with 14.5 grams of one of the modifiers shown in Table IIIa. The solutions obtained were catalyzed, foamed, and dried in the manner shown for Examples I–VI. The characteristics of these foams are given in Table IIIb.

TABLE IIIa

| Example: | Modifier |
|---|---|
| VII | tris hydroxymethyl aminomethane¹. |
| VIII | Glycerine. |
| IX | Polypropylene glycol². |
| X | Polypropylene glycol³. |
| XI | Propylene glycol. |

¹ 0.2 mol per mol of melamine.
² NIAX diol PPG—2025; molecular weight equals 2000; hydroxyl No. equals 56; a diol.
³ NIAX diol PPG—425; molecular weight equals 400; hydroxyl No. equals 265; a diol.

TABLE IIIb

| Foam | pH | Density (lbs./ft.³) | Forms a stable foam | Number of cracks formed on drying |
|---|---|---|---|---|
| VII | 4.2 | 5.9 | Yes | 0 |
| VIII | 3.9 | 5.9 | Yes | 32 |
| IX | 3.7 | | No | |
| X | 3.8 | | No | |
| XI | 3.9 | 5.9 | Yes | 79 |

Even under these severe conditions, i.e., higher densities, a tris hydroxymethyl aminomethane-modified resin gave excellent non-cracking foams.

Example XII 59 grams of triethanolamine (approximately one mol per mol of melamine) were added to 100 grams of melamine-formaldehyde resin having a mol ratio of melamine to formaldehyde of 1:4, respectively. This blend was foamed up in the manner of the preceding examples at a pH of 3.1–3.3 to produce a stable foam, which was then dried. The resulting foam had a density of 5.1 lbs./ft.$^3$ and did not crack either on drying or when the dried foam was further heated for 30 minutes at 300° F.

Example XIII

Example VII was repeated with the exception that orthophosphoric acid was substituted for formic acid as the curing catalyst in an amount sufficient to produce a stable foam of pH 4.05. This foam did not crack on drying, and the dried foam had a density of 5.0 lbs./ft.$^3$. This foam had the additional advantage of being nonflammable, even when filled with cellulose fiber.

It will be obvious that other changes and variations may be made in carrying out the present invention without departing from the spirit and scope thereof as defined in the appended claims.

We claim:

1. A heat resistant, cured cellular article of manufacture exhibiting improved resistance to cracking on drying which comprises a thermoset aminotriazine-aldehyde resin modified with an aliphatic primary triol, the aminotriazine component of said resin initially containing at least two amidogen groups each having at least one aldehyde-reactable hydrogen atom attached to the amidogen nitrogen atom, the mol ratio of said triol to said aminotriazine component being from about 0.2:1 to about 1:1, respectively.

2. A heat resistant, cured cellular article of manufacture exhibiting improved resistance to cracking on drying which comprises a thermoset aminotriazine-aldehyde resin modified with a trialkylolalkane represented by the structural formula:

$$H-(C_nH_{2n-2}) \equiv [(CH_2)_{n_1}-(CH_2OH)]_3$$

wherein $n$ is an integer of from about 1 to 7, $n_1$ is an integer of from 0 to 6, and the sum of the integers $n$ and $n_1$ is from 1 to 7, the aminotriazine component of said resin initially containing at least two amidogen groups each having at least one aldehyde-reactable hydrogen atom attached to the amidogen nitrogen atom, the mol ratio of said trialkylolalkane to said aminotriazine component being from about 0.2:1 to about 1:1, respectively.

3. A heat resistant, cured cellular article of manufacture exhibiting improved resistance to cracking on drying which comprises a thermoset aminotriazine-aldehyde resin modified with a trimethylolalkane represented by the structural formula:

$$H-(C_nH_{2n-2}) \equiv [(CH_2)_{n_1}-(CH_2OH)]_3$$

wherein $n$ is an integer of from 1 to 7, the aminotriazine component of said resin initially containing at least two amidogen groups each having at least one aldehyde-reactable hydrogen atom attached to the amidogen nitrogen atom, the mol ratio of said trimethylolalkane to said aminotriazine component being from about 0.2:1 to about 1:1, respectively.

4. A heat resistant, cured cellular article of manufacture exhibiting improved resistance to cracking on drying which comprises a thermoset aminotriazine-aldehyde resin modified with a trialkylolmethane represented by the structural formula:

$$HC \equiv [(CH_2)_n-CH_2OH]_3$$

wherein $n$ is an integer of from 0 to 6, the aminotriazine component of said resin initially containing at least two amidogen groups each having at least one aldehyde-reactable hydrogen atom attached to the amidogen nitrogen atom, the mol ratio of said trialkylolmethane to said aminotriazine component being from about 0.2:1 to about 1:1, respectively.

5. A heat resistant, cured cellular article of manufacture exhibiting improved resistance to cracking on drying which comprises a thermoset aminotriazine-aldehyde resin modified with a trialkylol aminomethane represented by the structural formula:

$$H_2N-C \equiv [(CH_2)_n-CH_2OH]_3$$

wherein $n$ is an integer of from 0 to 6, the aminotriazine component of said resin initially containing at least two amidogen groups each having at least one aldehyde-reactable hydrogen atom attached to the amidogen nitrogen atom, the mol ratio of said trialkylol aminomethane to said aminotriazine component being from about 0.2:1 to about 1:1, respectively.

6. A heat resistant, cured cellular article of manufacture exhibiting improved resistance to cracking on drying which comprises a thermoset aminotriazine-aldehyde resin modified with a trialkylolamine represented by the structural formula:

$$N \equiv [(CH_2)_n-CH_2OH]_3$$

wherein $n$ is an integer of from 0 to 7, the aminotriazine component of said resin initially containing at least two amidogen groups each having at least one aldehyde-reactable hydrogen atom attached to the amidogen nitrogen atom, the mol ratio of said trialkylolamine to said aminotriazine component being from about 0.2:1 to about 1:1, respectively.

7. A heat resistant, cured cellular article of manufacture exhibiting improved resistance to cracking on drying which comprises a thermoset aminotriazine-aldehyde resin modified with a trimethylolethane, the aminotriazine component of said resin initially containing at least two amidogen groups each having at least one aldehyde-reactable hydrogen atom attached to the amidogen nitrogen atom, the mol ratio of said trimethylolethane to said aminotriazine component being from about 0.2:1 to 1:1, respectively.

8. A heat resistant, cured cellular article of manufacture exhibiting improved resistance to cracking on drying which comprises a thermoset aminotriazine-aldehyde resin modified with a trimethylolpropane, the aminotriazine component of said resin initially containing at least two amidogen groups each having at least one aldehyde-reactable hydrogen atom attached to the amidogen nitrogen atom, the mol ratio of said trimethylolpropane to said aminotriazine component being from about 0.2:1 to about 1:1, respectively.

9. A heat resistant, cured cellular article of manufacture exhibiting improved resistance to cracking on drying which comprises a thermoset aminotriazine-aldehyde resin modified with tris hydroxymethyl aminomethane, the aminotriazine component of said resin initially containing at least two amidogen groups each having at least one aldehyde-reactable hydrogen atom attached to the amidogen nitrogen atom, the mol ratio of said tris hydroxymethyl aminomethane to said aminotriazine component being from about 0.2:1 to about 1:1, respectively.

10. A heat resistant, cured cellular article of manufacture exhibiting improved resistance to cracking on drying which comprises a thermoset melamine-formaldehyde resin modified with a trimethylolethane in a mol ratio of said trimethylolethane to melamine of from about 0.2:1 to about 1:1, respectively.

11. A heat resistant, cured cellular article of manufacture exhibiting improved resistance to cracking on drying which comprises a thermoset melamine-formaldehyde resin modified with a trimethylolpropane in a mol ratio of said trimethylolpropane to melamine of from about 0.2:1 to about 1:1, respectively.

12. A heat resistant, cured cellular article of manufacture exhibiting improved resistance to cracking on drying which comprises a thermoset melamine-formaldehyde resin modified with tris hydroxymethyl aminomethane in a mol ratio of tris hydroxymethyl aminomethane to melamine of from about 0.2:1 to about 1:1, respectively.

References Cited in the file of this patent

UNITED STATES PATENTS

| | | |
|---|---|---|
| 2,197,357 | Widmer | Apr. 16, 1940 |
| 2,789,095 | Lindvig | Apr. 16, 1957 |
| 2,930,771 | Wade | Mar. 29, 1960 |
| 2,970,120 | Kreidl et al. | Jan. 31, 1961 |